United States Patent
Penello et al.

(10) Patent No.: US 9,924,806 B2
(45) Date of Patent: Mar. 27, 2018

(54) PORTABLE BABY-CHANGING TABLE APPARATUS ATTACHABLE TO A BABY STROLLER

(71) Applicants: Daniel Penello, St. Petersburg, FL (US); Magdalini Penello, St. Petersburg, FL (US)

(72) Inventors: Daniel Penello, St. Petersburg, FL (US); Magdalini Penello, St. Petersburg, FL (US)

( * ) Notice: Subject to any disclaimer, the term of this patent is extended or adjusted under 35 U.S.C. 154(b) by 258 days.

(21) Appl. No.: 14/756,316

(22) Filed: Aug. 26, 2015

(65) Prior Publication Data

US 2017/0055721 A1    Mar. 2, 2017

(51) Int. Cl.
*B68G 5/00* (2006.01)
*A47D 5/00* (2006.01)
*B62B 9/12* (2006.01)

(52) U.S. Cl.
CPC .............. *A47D 5/006* (2013.01); *B62B 9/12* (2013.01)

(58) Field of Classification Search
CPC .................................. A47D 5/006; B62B 9/12
See application file for complete search history.

(56) References Cited

U.S. PATENT DOCUMENTS

| | | | | |
|---|---|---|---|---|
| 5,234,224 A | * | 8/1993 | Kim | B62B 7/12 280/30 |
| 5,464,183 A | * | 11/1995 | McConnell | B62B 9/26 224/274 |
| 8,480,114 B1 | * | 7/2013 | Grantz | A47D 5/006 280/642 |
| 2016/0192787 A1 | * | 7/2016 | Perrin | A47D 1/006 297/16.1 |

* cited by examiner

*Primary Examiner* — David E Sosnowski

(57) ABSTRACT

A portable, foldable, baby-changing table unit is provided attachable to a baby stroller for support thereby. The baby-changing table unit includes connectors for connecting the baby-changing table unit to the stroller's baby car-seat connectors. The baby-changing table unit connectors comprise foldable, transversely adjustable connection legs adapted to mate with the female receptacle connectors on the stroller normally used to releasably connect to a baby car-seat. A flexible changing pad is adapted to be attached to the portable, baby-changing table unit. The flexible changing pad includes a diaper receiver and a handy-wipe receiver. The flexible changing pad serves the dual purpose of functioning also as a carry case for the baby-changing table unit when the table is in a folded condition. An accessory connector assembly may be provided to attach the baby-changing unit to a stroller lacking a baby car-seat connector assembly.

6 Claims, 6 Drawing Sheets

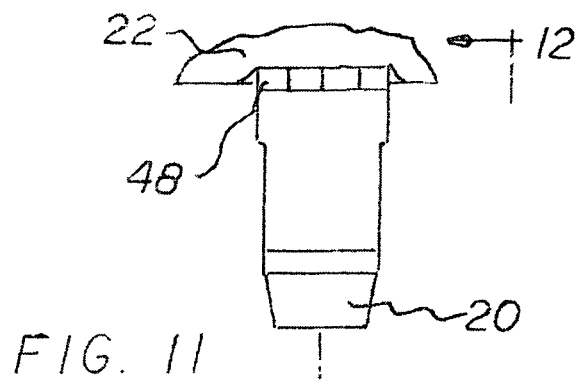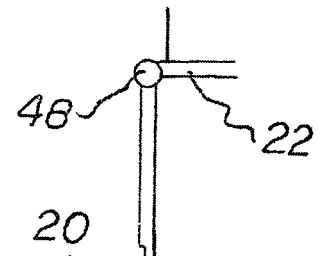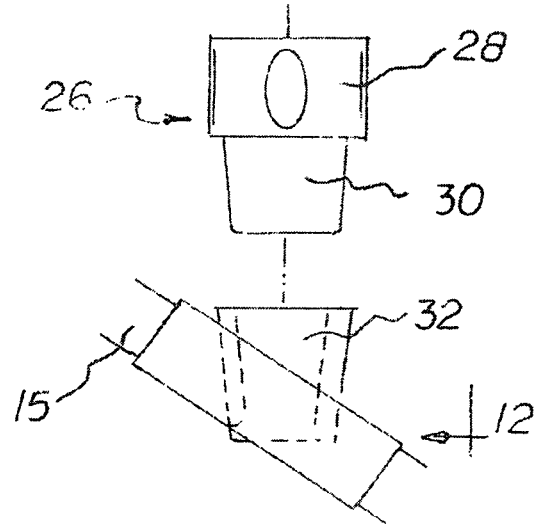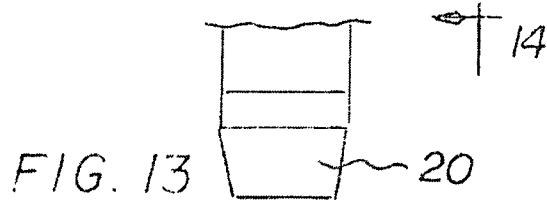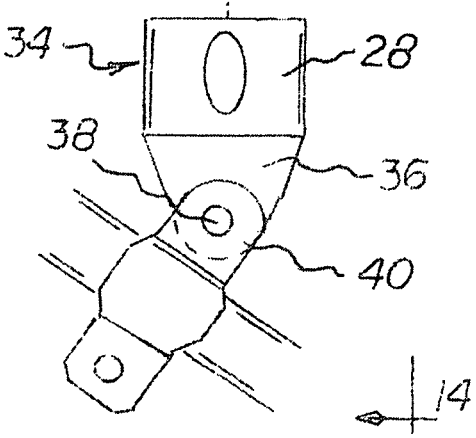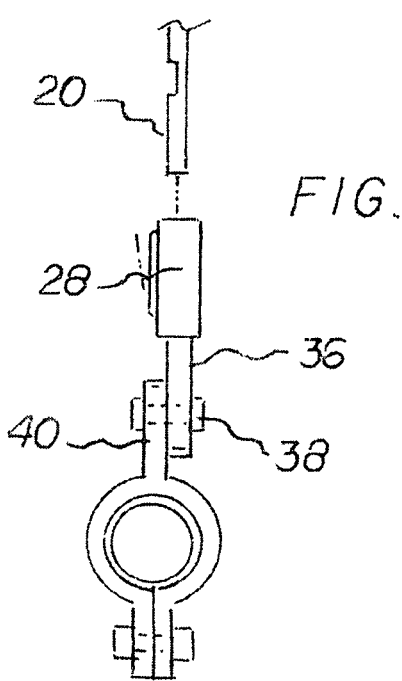
FIG. 11
FIG. 12
FIG. 13
FIG. 14

PORTABLE BABY-CHANGING TABLE APPARATUS ATTACHABLE TO A BABY STROLLER

BACKGROUND OF THE INVENTION

Field of the Invention

The present invention relates generally to a portable, baby-changing table and, more particularly, to a portable, baby-changing table which is especially adapted for attachment to and support by a baby stroller.

Description of the Prior Art

The combination of a portable, baby-changing device and a baby stroller are well known in the art. In this respect, throughout the years, a number of innovations have been developed relating to a portable, baby-changing device combined with a baby stroller, and the following U.S. patents are representative of some of those innovations:

U.S. Pat. No. 5,234,2245 (Kim)
U.S. Pat. No. 5,676,386 (Huang)
U.S. Pat. No. 6,389,624 (Madole)
U.S. Pat. No. 8,151,389 (Lando)
U.S. Pat. No. 8,480,114 (Grantz)

Kim discloses the general idea of supporting a foldable baby changing table on the frame of a stroller. See Kim's FIG. 8 and related discussion. When not in use, the folded baby-changing table is supported on and behind the stroller pusher-handle by a clamp (see Kim's FIG. 1).

Huang discloses a modified "Evenflow" baby safety seat attachable to a stroller by way of a proprietary locking mechanism.

Madole shows a portable, foldable baby-changing table of the "surface supported" type.

Lando teaches the combination of foldable baby-changing mat and a stroller.

Grantz discloses a foldable baby-changing table integrally and pivotally attached to the top portion of a baby stroller handle.

In this respect, the Kim, Lando and Grantz references are mostly of interest because each relates to a combined baby-changing device and a stroller.

As further background, when taking a baby out of the home, it is inevitable that one will have to change the baby's diaper in a public place, such as a restaurant, store, airport, park, beach, mall, or even another person's home.

In general, the current options are to find a nearby restroom which has a built-in baby change table for public use, or to change the baby on an existing surface such as the floor, a table, bed, bench, vehicle tailgate, or the like.

Many portable baby change tables are currently on the market and fall into two main categories: (i) free-standing, and (ii) surface cover.

The free-standing portable change tables are large and fold open like a tent or beach chair. They have legs that raise the table to an appropriate and comfortable level. However, they are large and cannot be carried in a baby bag or stroller making them impractical for daily use.

The surface covers range from flat pads to mini tables with very short legs. These products are more easily transportable than the free standing tables. However they must be placed on another surface to function. That surface could be a floor, the ground, a bed, counter, etc. One problem with these products is that these surfaces are not always available or practical to use. Another problem is the lack of height which requires the person changing the baby to do so while sitting on the ground or floor if no other surface is available. One would not want to change your baby on a public restroom floor, or on beach sand which can be blown onto the baby's face by a gust of wind.

Simply stated, many public places (such as the beach or park) do not have easily accessible restrooms, or the restrooms do not have a change table. In fact, change tables are almost exclusively located in the women's restroom but not in the men's restroom, making it challenging for fathers to change a baby's diaper in public.

Many restrooms do not have appropriate hard surfaces, such as a wide counter on which to lay a pad for changing purposes. Lastly, even if a public restroom contains a baby change table, hygiene and safety are common concerns as the change tables are often dirty, having been soiled by other children's stool or urine. Studies have identified a number of very virulent microorganisms living of public change table surfaces, including flesh eating bacteria. In many cases, public change tables also appear worn and unsecure.

Given the above situation, there exists a need for a method and means to simplify the very common task of changing a baby's diaper in a safe, secure, convenient, clean and comfortable fashion, especially when out of the home.

None of the prior patents discussed above and none of the other current alternatives discussed above discloses or suggests a desirable feature of mounting a portable, foldable baby-changing table on a baby stroller using the same or equivalent mechanism on the stroller that is also used to engage a removable baby car seat.

Still other features would be desirable in a portable baby-changing table apparatus attachable to a baby stroller. It is rigid and is securely attached to the stroller. It holds as much weight as a baby car seat. It is easy to clean. It allows one to leave the baby safely in their baby car seat during assembly and disassembly (unlike all other competitors) which require one to hold the baby in one's arms. It permits one to wipe down the plastic table, remove it from the baby car seat attachment on the stroller with the click of a button, and fold it neatly away in the carrying case. It can be stored beneath the stroller. It provides a carrying case that unfolds and serves as a changing pad. It has pockets which hold stored diapers and wipes for easy access, whereby one does not have to take out one's diaper bag when changing the baby's diaper, and has a safety strap. It has unfolding legs that click into the existing baby car seat attachments on most strollers. It satisfies a need for a method and means to simplify the very common task of changing a baby's diaper in a safe, secure, convenient, clean and comfortable fashion.

Thus, while the foregoing body of prior art indicates it to be well known to use baby diaper changing tables in combination with a stroller, the prior art and background described above do not teach or suggest a portable baby-changing table apparatus attachable to a baby stroller which has the following combination of desirable features: (1) provides mounting a portable, foldable baby-changing table on a baby stroller using the same or equivalent mechanism on the stroller that is also used to engage a removable baby car seat; (2) is rigid and is securely attached to the stroller; (3) holds as much weight as a baby car seat; (4) is easy to clean; (5) allows one to leave the baby safely in their car seat during assembly and disassembly without requiring one to hold the baby in one's arms; (6) allows one to wipe down the plastic table, remove it from the baby car seat attachment on the stroller with the click of a button, and fold it neatly away in the carrying case; (7) provides a carrying case which unfolds and serves as a changing pad; has pockets which hold stored diapers and wipes for easy access, whereby one does not have to take out one's diaper bag, and has a safety strap for the table; (8) has unfolding legs that click into the existing car seat attachments on most strollers; (9) satisfies a need for a method and means to simplify the very common task of changing a baby's diaper in a safe, secure, convenient, clean and comfortable fashion; and (10) can be stored beneath the stroller.

The foregoing desired characteristics are provided by the unique portable baby-changing table apparatus attachable to a baby stroller of the present invention as will be made apparent from the following description thereof. Other advantages of the present invention over the prior art also will be rendered evident.

SUMMARY OF THE INVENTION

To achieve the foregoing and other advantages, the present invention, briefly described, provides a portable baby-changing table apparatus which is attachable to a baby stroller. The portable baby-changing table apparatus includes a portable, baby-changing table unit. Baby-changing-unit-mounted connection means are provided for connecting the portable, baby-changing table unit to the baby stroller. Stroller-mounted connection means are provided for connecting with the baby-changing-unit-mounted connection means.

Preferably, the baby-changing-unit-mounted connection means include baby-changing-unit-mounted connection legs.

Preferably, the baby-changing-unit-mounted connection legs are mounted on sliders received in a sliders-reception channel located on the bottom of the portable, baby-changing table unit. Connection-leg hinges connect the sliders to the baby-changing-unit-mounted connection legs.

The stroller-mounted connection means is also connectable to a baby car seat which includes complimentary baby-car-seat-mounted connection means.

The baby-changing-unit-mounted connection means and the baby-car-seat-mounted connection means are substantially equivalent to each other with respect to their connectability to complimentary stroller-mounted connection means.

Preferably, a flexible changing pad is attached to the portable, baby-changing table unit. The flexible changing pad includes a diaper receiver and a handy-wipe receiver.

Preferably, the flexible changing pad includes a first changing pad portion and a second changing pad portion which are connected together by a pad-to-pad hinge.

Interconnection adaptor units can be located between the baby-changing-unit-mounted connection means and the stroller-mounted connection means.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining several preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved portable baby-changing table apparatus attachable to a baby stroller which has all of the advantages of the prior art and none of the disadvantages.

It is another object of the present invention to provide a new and improved portable baby-changing table apparatus attachable to a baby stroller which may be easily and efficiently manufactured and marketed.

It is a further object of the present invention to provide a new and improved portable baby-changing table apparatus attachable to a baby stroller which is of durable and reliable construction.

An even further object of the present invention is to provide a new and improved portable baby-changing table apparatus attachable to a baby stroller which is susceptible of a low cost of manufacture with regard to both materials and labor, and which accordingly is then susceptible of low prices of sale to the consuming public, thereby making such portable baby-changing table apparatus attachable to a baby stroller available to the buying public.

Still yet a further object of the present invention is to provide a new and improved portable baby-changing table apparatus attachable to a baby stroller which provides mounting a portable, foldable baby-changing table on a baby stroller using the same or equivalent mechanism on the stroller that is also used to engage a removable baby car seat.

Still another object of the present invention is to provide a new and improved portable baby-changing table apparatus attachable to a baby stroller that is rigid in construction and adapted to be securely attached to the stroller.

Yet another object of the present invention is to provide a new and improved portable baby-changing table apparatus attachable to a baby stroller which holds as much weight as a car seat.

Even another object of the present invention is to provide a new and improved portable baby-changing table apparatus attachable to a baby stroller that is easy to clean.

Still a further object of the present invention is to provide a new and improved portable baby-changing table apparatus attachable to a baby stroller which allows one to leave the baby safely in their car seat during assembly and disassembly without requiring one to hold the baby in one's arms.

Yet another object of the present invention is to provide a new and improved portable baby-changing table apparatus attachable to a baby stroller that allows one to wipe down the plastic table, remove it from the car seat attachment on the stroller with the click of a button, and fold it neatly away in the carrying case.

Still another object of the present invention is to provide a new and improved portable baby-changing table apparatus attachable to a baby stroller which provides a carrying case which unfolds and serves as a changing pad, has pockets which hold stored diapers and wipes for easy access, whereby one does not have to take out one's diaper bag, and has a safety strap.

Yet another object of the present invention is to provide a new and improved portable baby-changing table apparatus attachable to a baby stroller that has unfolding legs that click into the existing car seat attachments on most strollers.

Still a further object of the present invention is to provide a new and improved portable baby-changing table apparatus attachable to a baby stroller that satisfies a need for a method to simplify the very common task of changing a baby's diaper in a safe, secure, convenient, clean and comfortable fashion.

Yet another object of the present invention is to provide a new and improved portable baby-changing table apparatus attachable to a baby stroller which can be stored beneath the stroller.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 11 is an exploded side view of a first type of universal interconnection adaptor unit having a top adaptor leg-reception portion for receiving a baby-changing-unit-mounted connection leg, wherein the first type of interconnection adaptor unit also includes a bottom adaptor male wedge portion for reception in a complimentary top wedge-reception bracket attached to a portion of the frame of the baby stroller.

FIG. 12 is an exploded front view of the first type of interconnection adaptor unit shown in FIG. 11.

FIG. 13 is an exploded side view of a second type of universal interconnection adaptor unit having a top adaptor leg-reception portion for receiving a baby-changing-unit-mounted connection leg, wherein the second type of interconnection adaptor unit also includes a bottom adaptor hinge reception portion for reception of an interconnection adaptor hinge which connects with a complimentary top hinge reception portion mounted on frame of the baby stroller.

FIG. 14 is an exploded front view of the second type of interconnection adaptor unit shown in FIG. 13.

DESCRIPTION OF THE PREFERRED EMBODIMENT

Figure 1:
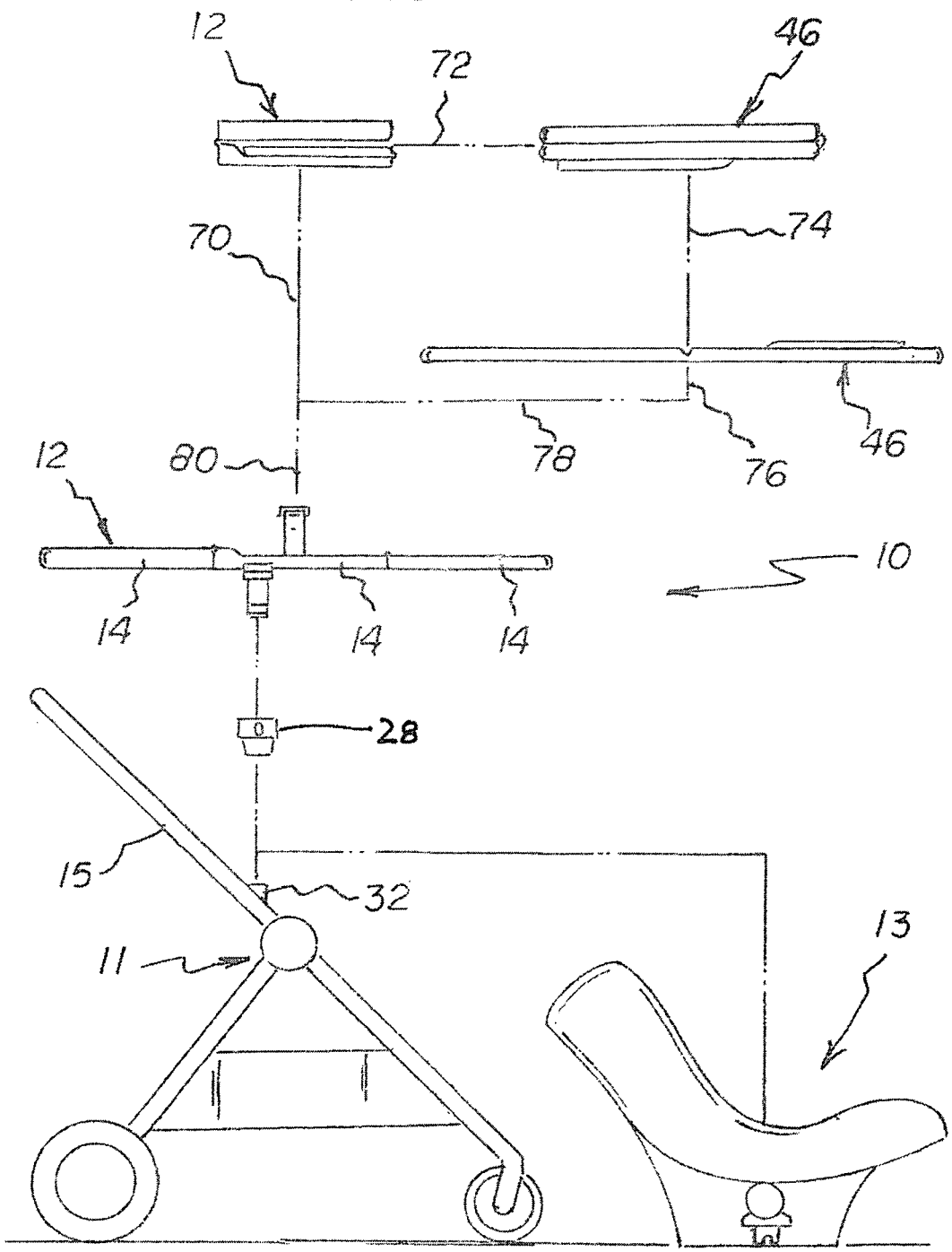
FIG. 1 is an exploded side view showing schematically the sequential steps of removing a first embodiment of the portable baby-changing table apparatus attachable to a baby stroller of the present invention from its carry case, which latter also serves as a changing pad for the baby-changing unit; unfolding the baby-changing unit; attaching the changing pad (unfolded carry case) to the baby-changing table unit; and ultimately attaching the baby-changing table unit to a baby stroller after a baby-seat originally carried by the stroller has been removed, and wherein the baby-changing table unit with its baby changing pad in place is attachable to the baby stroller via the same connectors or receptacles on the stroller originally employed to connectably receive the baby-seat prior to its removal from the stroller.
Figure 2:
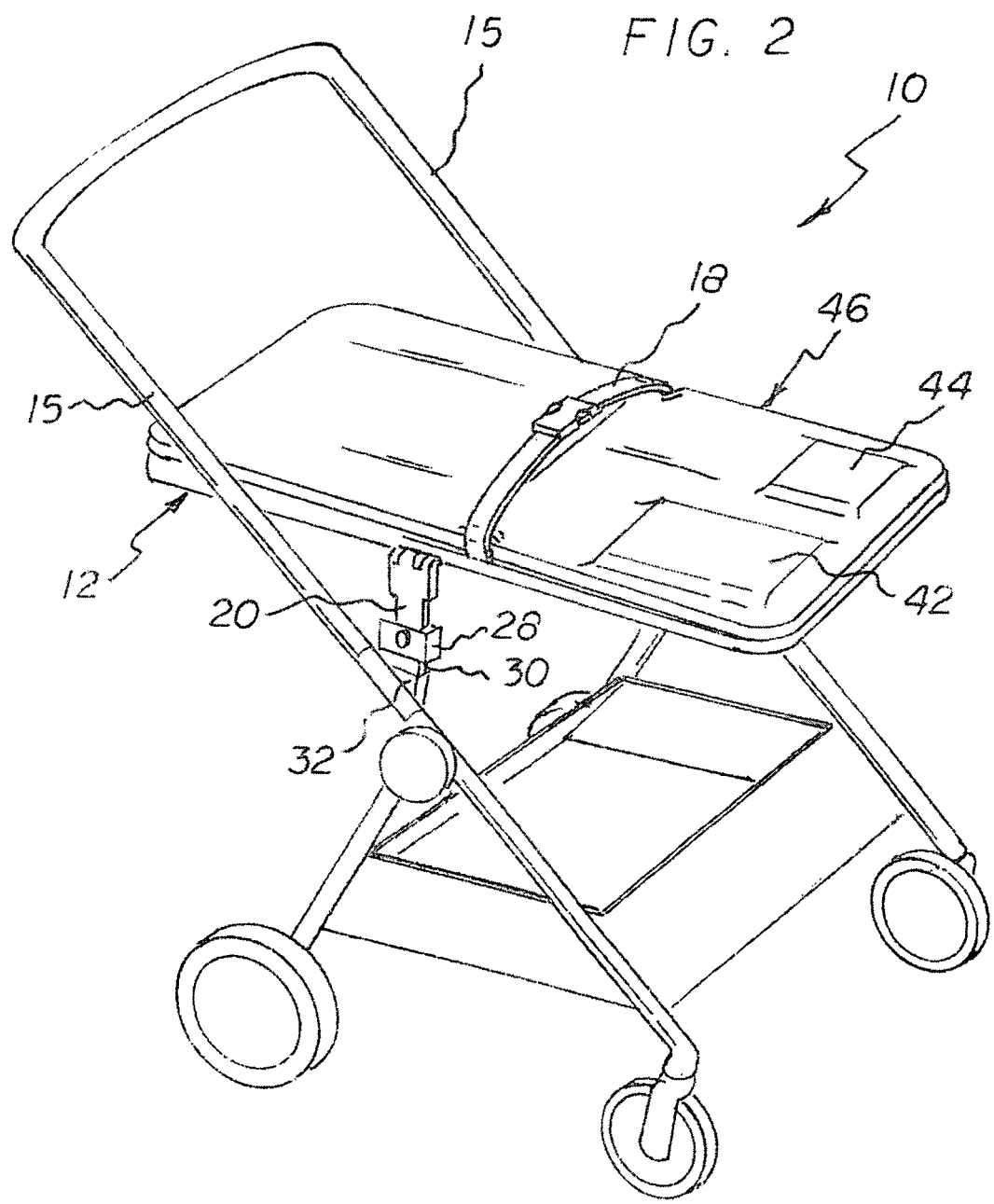
FIG. 2 is a perspective view of the embodiment of the portable baby-changing table apparatus attachable to a baby stroller shown in FIG. 1, wherein an unfolded embodiment of the portable, baby-changing table unit is attached to a baby stroller, shown in FIG. 1, and wherein the portable baby-changing table apparatus further includes a flexible changing pad having a diaper receiver (pocket) and a handy-wipe receiver (pocket) integrated therewith.

With reference to the drawings, a new and improved portable baby-changing table apparatus attachable to a baby stroller embodying the principles and concepts of the present invention will be described.

Turning initially to FIGS. 1-8, there is shown a first embodiment of the portable baby-changing table apparatus attachable to a baby stroller of the invention generally designated by reference numeral 10. In each of the figures, reference numerals are shown that correspond to like reference numerals that designate like elements shown in other figures.

In the first embodiment, portable baby-changing table apparatus 10 is attachable to a baby stroller 11. The portable baby-changing table apparatus 10 includes a portable, baby-changing table unit 12. Baby-changing-unit-mounted connection means are provided for connecting the portable, baby-changing table unit 12 to the baby stroller 11. Complimentary stroller-mounted connection means are provided for connecting with the baby-changing-unit-mounted connection means. Preferably, the baby-changing-unit-mounted connection means includes a pair of foldable, opposed baby-changing-unit-mounted connection legs 20.

Figure 6:
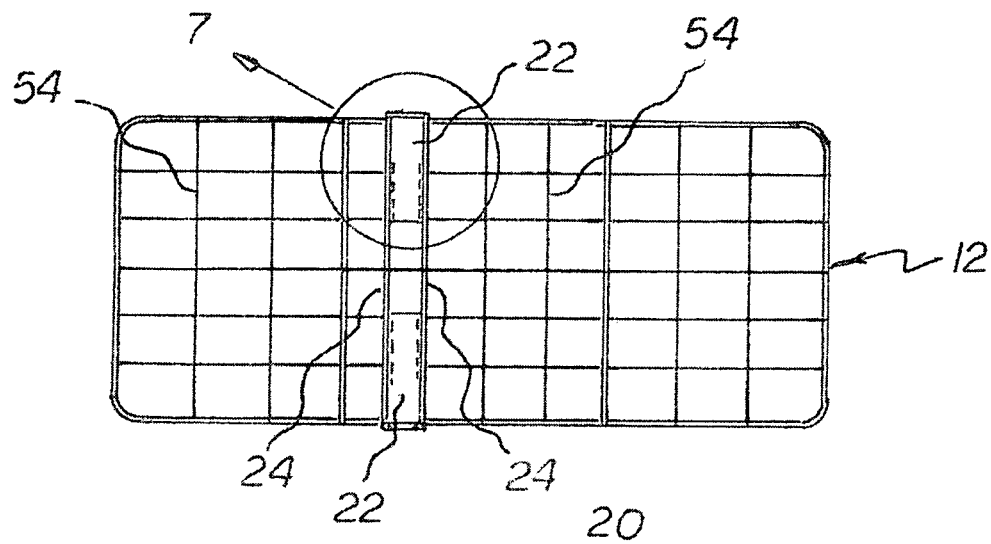
FIG. 6 is a bottom view of the portable, unfolded baby-changing table unit, taken along line 6-6 of FIG. 4, wherein an interior honeycomb structure is shown.
Figure 7:
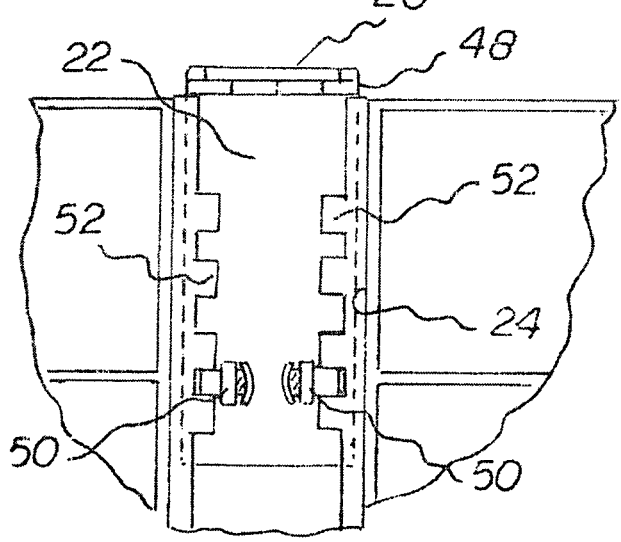
FIG. 7 is an enlarged portion of the bottom view of the unfolded portable, baby-changing table unit shown in FIG. 6, contained in circled region 7 thereof, wherein sliders are contained inside a sliders-reception channel.

Preferably, the baby-changing-unit-mounted connection legs 20 are mounted on respective sliders 22 received in a sliders-reception channel 24 located on the bottom of the portable, baby-changing table unit 12 (FIGS. 6 and 7). Connection-leg hinges 48 connect the sliders 22 to the foldable baby-changing-unit-mounted connection legs 20.

In accordance with an important feature of the invention, the opposed sliders 22 are axially movable in their sliders-reception channel 24, i.e. they can be adjustably displaced transversely relative to each other and to the longitudinal axis of the baby-changing table unit 12. In this manner, the connection legs are adjustably "spreadable" so as to have the capability of being placed in precise registration with the stroller-mounted connection means for secure connection therewith whereby the baby-changing table unit of the invention can accommodate various widths of baby strollers 11.

Preferably, slider lock tabs 50 are mounted on the sliders 22, and lock-tab reception teeth 52 are located in walls of the sliders-reception channel 24. The slider lock tabs 50 resiliently, selectively interlock with selected lock-tab reception teeth 52, for selectively adjusting the locking width of the baby-changing-unit-mounted connection legs 20 for various widths of the baby stroller 11.

As mentioned above, in accordance with the present invention, means are provided for connecting the baby-changing table unit connection means to stroller-mounted connection means normally used to connect to a baby car-seat. More specifically, as depicted in FIGS. 1, 3-5, 11 and 12, each connection leg 20 terminates in a male fastener member adapted to cooperatively mate with a releasable, lockable, female receptacle 28 mounted on frame portion 15 of stroller 11. Typically, in many strollers, female receptacle 28 is mounted on an extension 30 which is adapted to be received in a complimentary sleeve on frame portion bracket 32. Extension 30 can be tapered and wedged into the sleeve, or alternatively, suitably secured within the sleeve by any conventional fastening means such as a rivet, screw, weld, or the like (not shown). Female receptacle 28 can be the same conventional receptacle used on the stroller 15 to connect to the male fastener member on a conventional baby car-seat (see FIG. 1). By the same token, each male fastener member on the distal extremity of leg 20 and each female receptacle 28 can be substantially equivalent to conventional fastener assemblies used on conventional vehicle seat belts. In this respect, and as substantially depicted in FIG. 2, after the baby car-seat 13 has been removed from the stroller 11, by unlatching its male connectors from the complimentary female connectors 28 on stroller frame portions 15, the unfolded, portable baby-changing table unit 12 of the invention with its pad 46 may securely be fastened in position on the stroller by causing connection legs 20 to engage the same original-equipment fastener receptacles 28 on the stroller 11 also used to retain the baby car-seat 13.

Preferably, the portable, baby-changing table unit 12 is fabricated from a durable thermoplastic material and in this regard, includes an interior honeycomb structure 54 on its bottom face substantially as depicted in FIGS. 6 and 7 which gives enhanced strength and rigidity to the portable, baby-changing table unit 12 while rendering it relatively light in weight.

Preferably, the portable, baby-changing table unit 12 is foldable for easy compact storage. In this respect, the portable, baby-changing table unit 12 includes foldable table first, second and third portions 14 that are connected to each other by table portion connection hinges 16. When unfolded, substantially as depicted in FIGS. 3-5, it will be appreciated that the baby-changing table unit 12 of the present invention provides a rectangular-shaped platform so dimensioned and configured as to optimally meet its intended purpose, i.e. to provide a portable, substantially rigid, baby-changing table securely supportable on a conventional baby-stroller or elsewhere where and when required.

Figure 8:
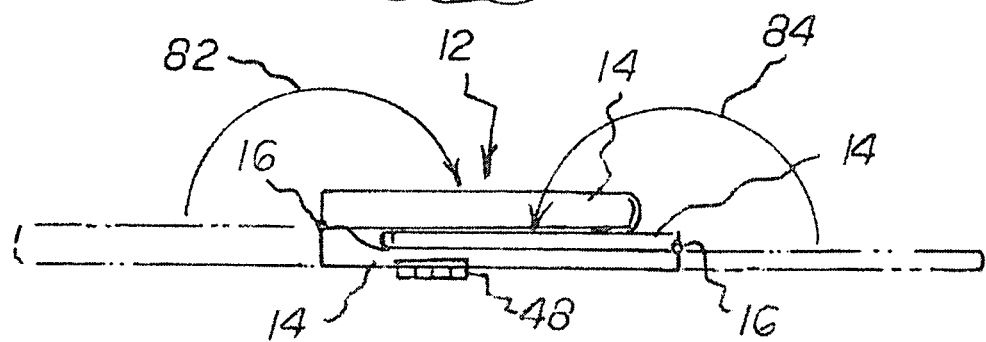
FIG. 8 is a side view of the portable, baby-changing table unit shown in FIG. 4, wherein the unfolded condition is shown in broken lines and the folded condition is shown in solid lines. More specifically, the back unfolded foldable table portion is shown to be rotatable counterclockwise around a first table portion connection hinge along a curved arrow to be disposed in the folded condition on top of the middle foldable table portion. In addition, the head unfolded table portion 14 is shown to be rotatable clockwise around a second table portion connection hinge along a curved arrow to be in a folded condition on top of the folded back foldable table portion.

As shown in FIG. 8, to fold the baby-changing unit 12 into its compact storage position, the third, unfolded foldable table portion 14 is rotated counterclockwise around table portion connection hinge 16 along the curved arrow 84 to be in the folded condition on top of the middle or second foldable table portion 14. In addition, the head or first unfolded table portion 14 is rotated clockwise around a table portion connection hinge 16 along the curved arrow 82 to be in a folded condition on top of the folded back foldable table portion 14.

Figure 3:
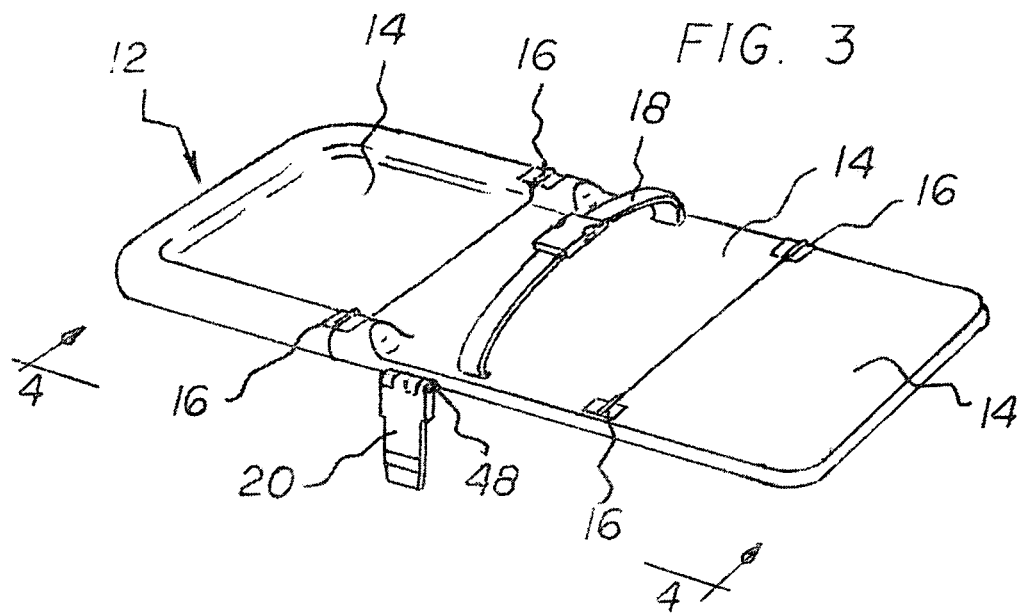
FIG. 3 is a perspective view of the unfolded embodiment of the portable, baby-changing table unit shown in FIG. 2, removed from the baby stroller and remaining in an unfolded condition.
Figure 4:
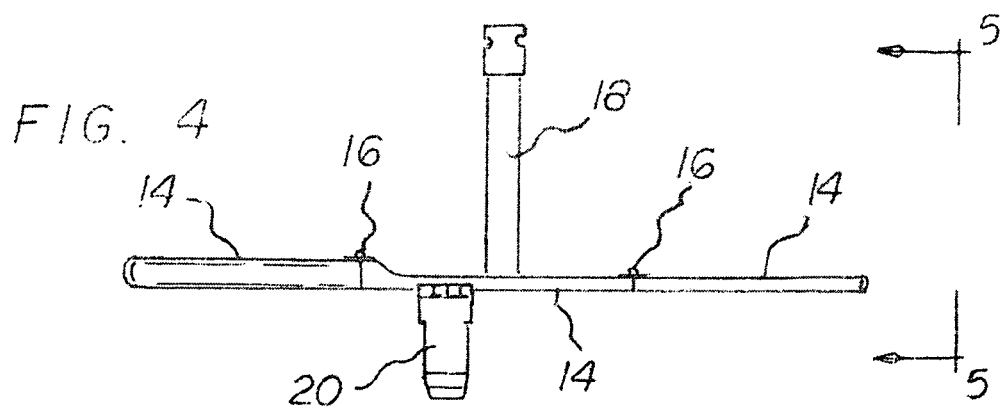
FIG. 4 is a side view of the portable, unfolded baby-changing table unit shown in FIG. 3, taken along line 4-4 thereof.
Figure 5:
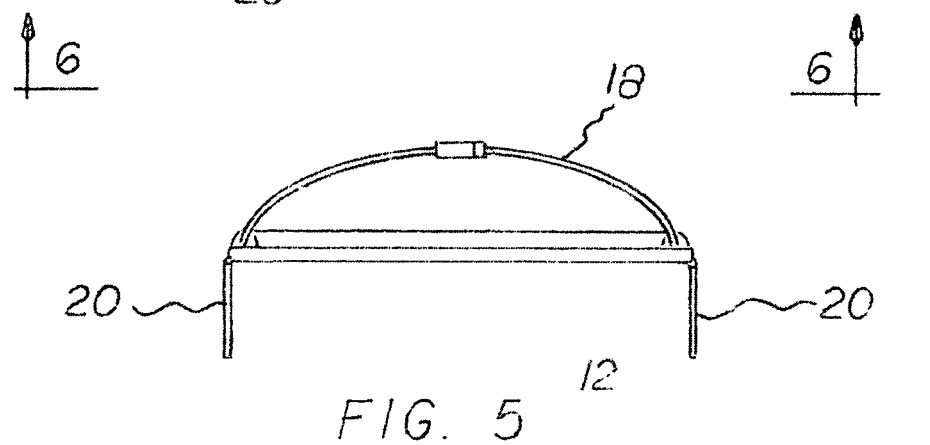
FIG. 5 is a front view of the portable, unfolded baby-changing table unit, taken along line 5-5 of FIG. 4.

Preferably, substantially as depicted, a safety strap 18 is connected to the portable, baby-changing table unit 12 for securing a baby onto the portable, baby-changing table unit 12 when the latter is in its unfolded condition (FIGS. 3-5). The safety strap 18 can also be used to retain the foldable table portions 14 in a compact folded condition, such as needed for storage.

The primary purpose of the flexible changing pad 46 is to serve as a removable, comfortable sanitary pad attached to and placed on the top or upper surface of portable, baby-changing table unit 12. In accordance with an important feature of the present invention, pad 46 can serve the dual purpose of functioning as a convenient carry-case for the portable, baby-changing table unit 12 when both units are in a folded condition. Moreover, for even further convenience, the flexible changing pad 46 also can include a diaper receiver or pocket 42 and a handy-wipe receiver or pocket 44.

Figure 9:
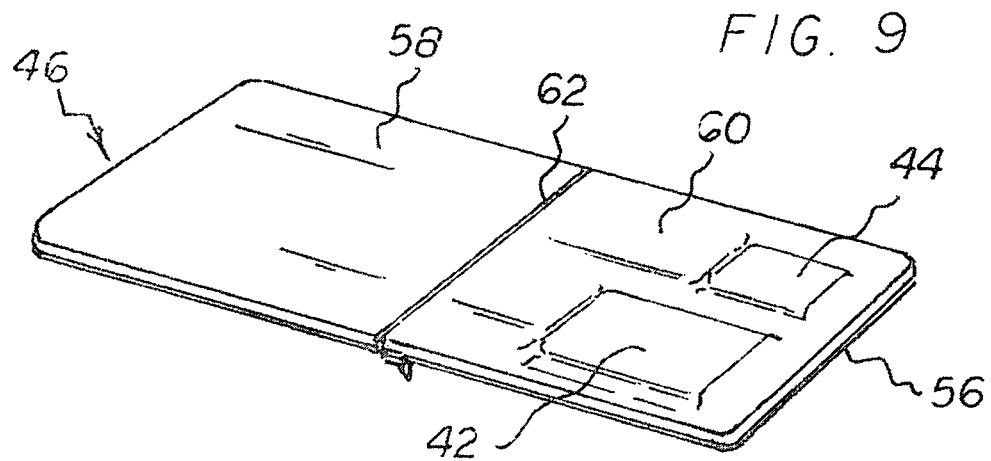
FIG. 9 is a perspective view of an unfolded flexible changing pad of the portable, baby-changing table unit of the invention, wherein the flexible changing pad includes a diaper receiver pocket and a handy-wipe receiver pocket. The flexible changing pad also includes a first changing pad portion and a second changing pad portion connected together with a pad-to-pad hinge.
Figure 10:
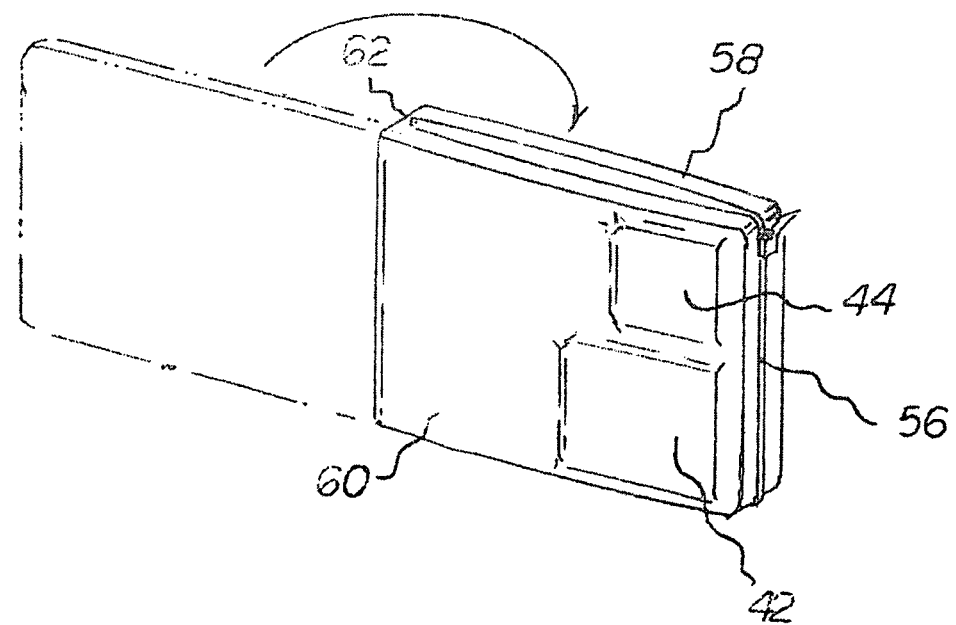
FIG. 10 is a perspective view of the embodiment of the flexible changing pad shown in FIG. 9, wherein the unfolded condition is shown in broken lines and the folded condition is shown in solid lines. In addition, a zipper is shown extending from a first flexible changing pad portion and a second flexible changing pad portion.

More specifically, the flexible changing pad 46 preferably includes a first changing pad portion 58, and a second changing pad portion 60 which are connected together by a pad-to-pad hinge 62, and a zipper 56 substantially as depicted in FIGS. 9 and 10. In FIG. 10, the unfolded condition of pad 46 is shown in broken lines and the folded condition is shown in solid lines. In addition, the zipper 56 is shown extending around the periphery of the first flexible changing pad portion 58 and the second flexible changing pad portion 60. When the first changing pad portion 58 and the second changing pad portion 60 are folded together around the pad-to-pad hinge 62, the zipper 56 retains the first changing pad portion 58 and the second changing pad portion 60 in the folded condition. This is in contrast to FIG. 2 which advantageously shows the changing pad 46 in the unfolded condition on the stroller-supported baby-changing table unit 12.

In certain cases, a stroller may lack a baby-seat connection means or require a unique or proprietary baby-seat connection means. In order to use the portable, baby-changing table unit 12 with such strollers, the alternatively preferred "universal" connection means or adaptor of FIGS. 13 and 14 further may be provided in combination with the portable, baby-changing table unit 12 of the present invention. Thus, as shown in FIGS. 13 and 14, a "universal" interconnection adaptor unit 34 is depicted having a top adaptor leg-reception portion 28 for receiving a corresponding baby-changing-unit-mounted connection leg 20, and further includes a bottom adaptor hinge reception portion 36 hingedly connected to a clamp-bracket 40. Clamp bracket 40, in turn, is suitably adapted to be easily affixed to stroller frame portions 15, preferably via conventional bolt fasteners 38, or the like, substantially as depicted.

In operation, when it is desired to use the apparatus of the invention in a first MODE NO. 1, where the stroller has a built-in car seat attachment means, the following exemplary procedure may be followed:

1. Remove the baby-changing table unit from its carrying case.
2. Unfold the baby-changing table unit until flat.
3. Turn the baby-changing table unit upside down and unfold the legs completely.
4. During initial assembly, each leg slides within a track. Loosen the resilient lock-fastener such that each leg is free to slide within the track.
5. During initial assembly, flip the baby-changing table over and align the legs to the car baby-seat attachments on the stroller. The side with the raised border is where the child's head will be placed. This part should be placed closest to the handle of the stroller.
7. Slide the baby-changing table unit into the car baby-seat attachment until they click into place.
8. Unfold the carrying case/table pad completely and lay it on the baby-changing table unit. The carrying case serves as a convenient changing pad.
9. Place baby on the baby-changing table unit and fasten the safety belt.

It will be noted that when it is desired to use the apparatus of the invention in a second MODE NO. 2, where the stroller does not have a built-in car seat attachment, the above procedure can be followed; but, first, "universal" adaptor mount of FIGS. 13 and 14 must be suitably attached to the stroller frame before Step. 1. This only needs to be completed during initial assembly. Once installed, the "universal" attachment assembly is intended to remain attached to the stroller for future use.

It is apparent from the above discussion that the present invention accomplishes all of the objects set forth by providing a new and improved portable baby-changing table apparatus attachable to a baby stroller that is low in cost, relatively simple in design and operation, and which may advantageously be used to provide mounting a portable, foldable baby-changing table on a baby stroller using the same or equivalent mechanism on the stroller that is also used to engage a removable baby car-seat.

With the invention, a portable baby-changing table apparatus attachable to a baby stroller is provided which is rigid and is securely attached to the stroller.

With the invention, a portable baby-changing table apparatus attachable to a baby stroller is provided which holds as much weight as a car seat.

With the invention, a portable baby-changing table apparatus attachable to a baby stroller is provided which is easy to clean.

With the invention, a portable baby-changing table apparatus attachable to a baby stroller is provided which allows one to leave the baby safely in their car seat during assembly and disassembly of the invention without requiring one to hold the baby in one's arms.

With the invention, a portable baby-changing table apparatus attachable to a baby stroller is provided which allows one to wipe down a plastic baby-changing table, remove that table from the car seat attachment on the stroller with the click of a button, and fold the baby-changing table neatly away in a carrying case.

With the invention, a portable baby-changing table apparatus attachable to a baby stroller provides a carrying case which unfolds and serves as a changing pad, and which has pockets which hold stored diapers and wipes for easy access, whereby one does not have to take out one's diaper bag.

With the invention, the portable baby-changing table apparatus has a safety strap. With the invention, a portable baby-changing table apparatus attachable to a baby stroller is provided which has unfolding legs that click into existing car seat attachments on most strollers.

With the invention, a portable baby-changing table apparatus attachable to a baby stroller is provided which satisfies a need for a method to simplify the very common task of changing a baby's diaper in a safe, secure, convenient, clean and comfortable fashion.

With the invention, a portable baby-changing table apparatus attachable to a baby stroller is provided which can be stored beneath the stroller.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A portable baby-changing table apparatus releasably-attachable to a baby stroller, wherein said baby stroller includes a stroller-mounted first connection device for connecting with a baby car-seat, said apparatus comprising:
    a generally planar, foldable, and portable, baby-changing table unit,
    wherein said portable, baby-changing table unit includes a second connection device for connecting to said stroller-mounted first connection device,
    wherein said baby-changing table unit second connection device includes a pair of opposed baby-changing table unit connection legs,
    wherein each leg of said pair of opposed baby-changing table unit connection legs is connected to and mounted on first and second sliders via corresponding first and second connection-leg hinges, respectively, and wherein the first and second sliders are received in a sliders-reception channel located on and extending transversely across a width of said portable, baby-changing table unit, each of the sliders being movable within the channel from a first position in which an outer edge of the slider is proximate to and substantially flush with a perimeter edge of the baby-changing table unit to a second position in which the outer edge of the slider extends beyond and is spaced from the perimeter edge of the baby-changing table unit, wherein said portable, baby-changing table unit further includes first and second locking members for locking said first and second sliders in a selected position within said sliders-reception channel, and wherein said second baby-changing table unit connection device is a pair of opposed male connection members, each male connection member being located on a corresponding leg of said pair of opposed baby-changing table connection legs, respectively, and wherein said stroller-mounted first connection device for connecting with a baby car-seat defines a pair of opposed female connection members, and wherein said male connection members and said female connection members are configured to engageably mate with each other.

2. The apparatus of claim 1, further including: a flexible changing pad attached to said portable, baby-changing table unit.

3. The apparatus of claim 2 wherein said flexible changing pad includes a diaper receiver and a wipe receiver.

4. The apparatus of claim 3 wherein said flexible changing pad includes includes a first changing pad portion and a second changing pad portion connected together by a pad-to-pad hinge.

5. The apparatus of claim 4 wherein said baby-changing table unit is foldable, and wherein said flexible changing pad includes peripheral closure means whereby said flexible changing pad serves the dual purpose of providing a carry case for said baby-changing table when said baby-changing table unit is in a folded condition.

6. The apparatus of claim 1 wherein said baby-changing table unit comprises first, second and third portions hingedly connected to each other such that said first portion can be folded relative to said second portion, said third portion can be folded relative to said second portion, and wherein said sliders-reception channel is located on said baby-changing table unit second portion.

\* \* \* \* \*